Feb. 28, 1961    R. W. BOSSEMEYER    2,973,414
CUTOFF DEVICE FOR WEIGHING SCALES
Filed July 6, 1956    4 Sheets-Sheet 1
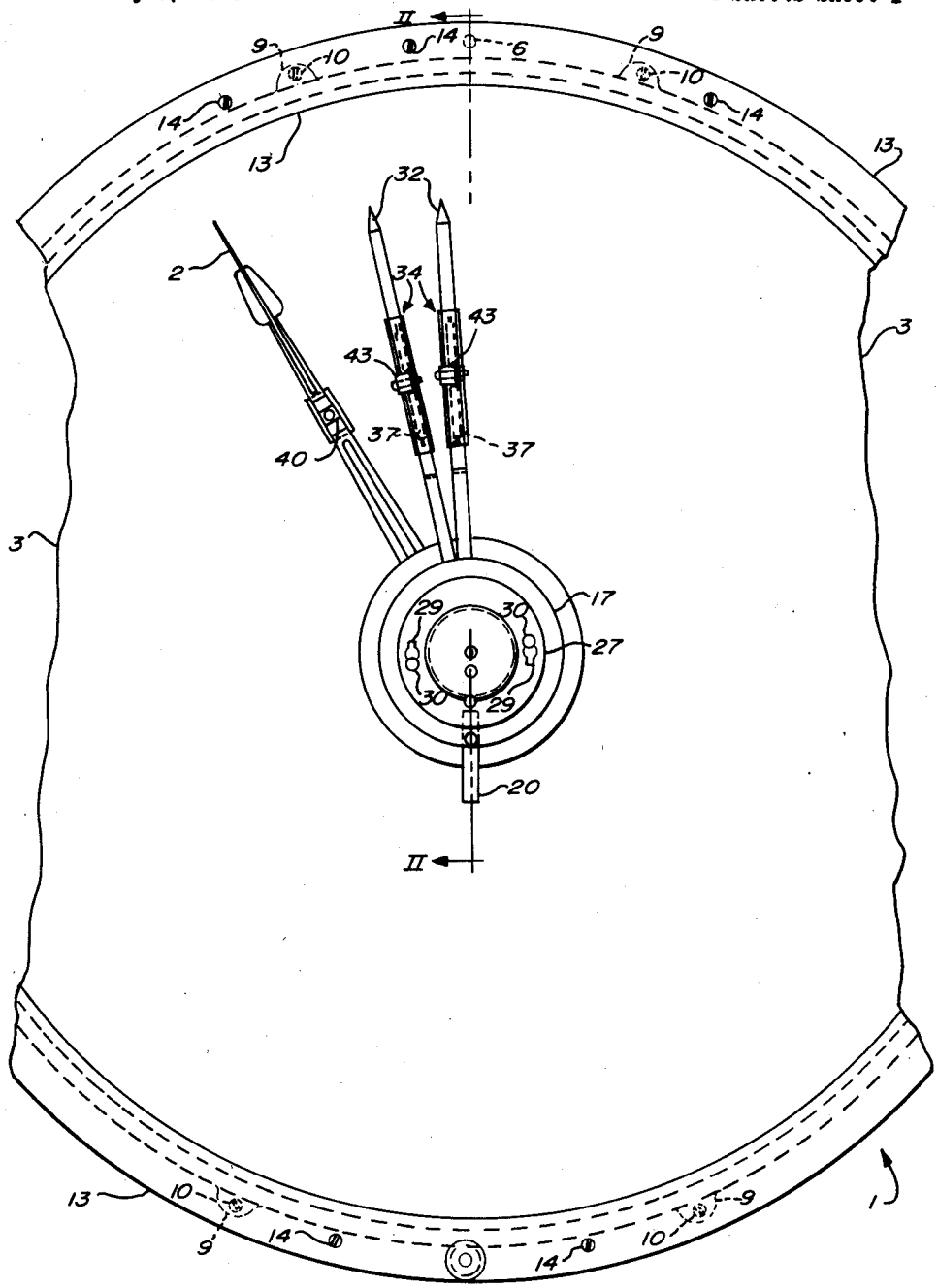
Fig. I
INVENTOR.
ROBERT W. BOSSEMEYER.
BY
Marshall, Marshall & Yeasting
ATTORNEYS Feb. 28, 1961 R. W. BOSSEMEYER 2,973,414
CUTOFF DEVICE FOR WEIGHING SCALES
Filed July 6, 1956 4 Sheets-Sheet 2
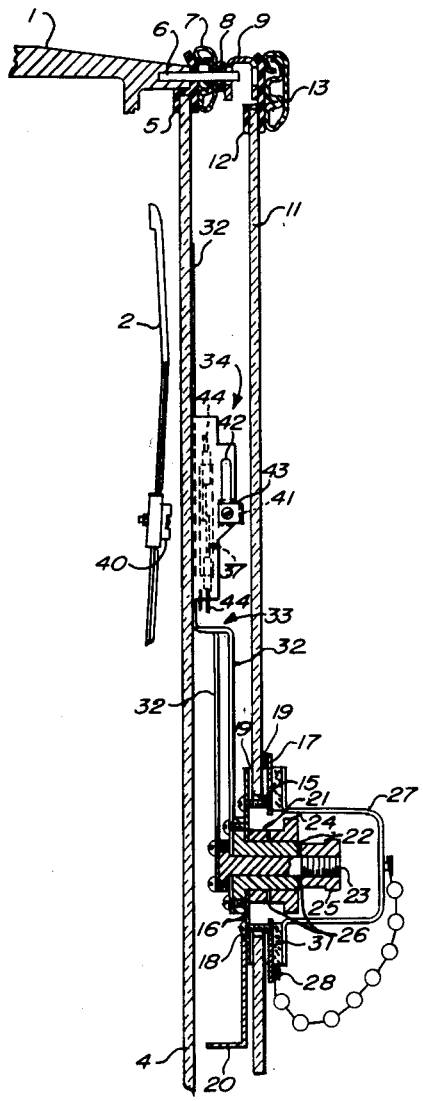
Fig. II
INVENTOR.
ROBERT W. BOSSEMEYER
BY
Marshall, Marshall & Yeasting
ATTORNEYS

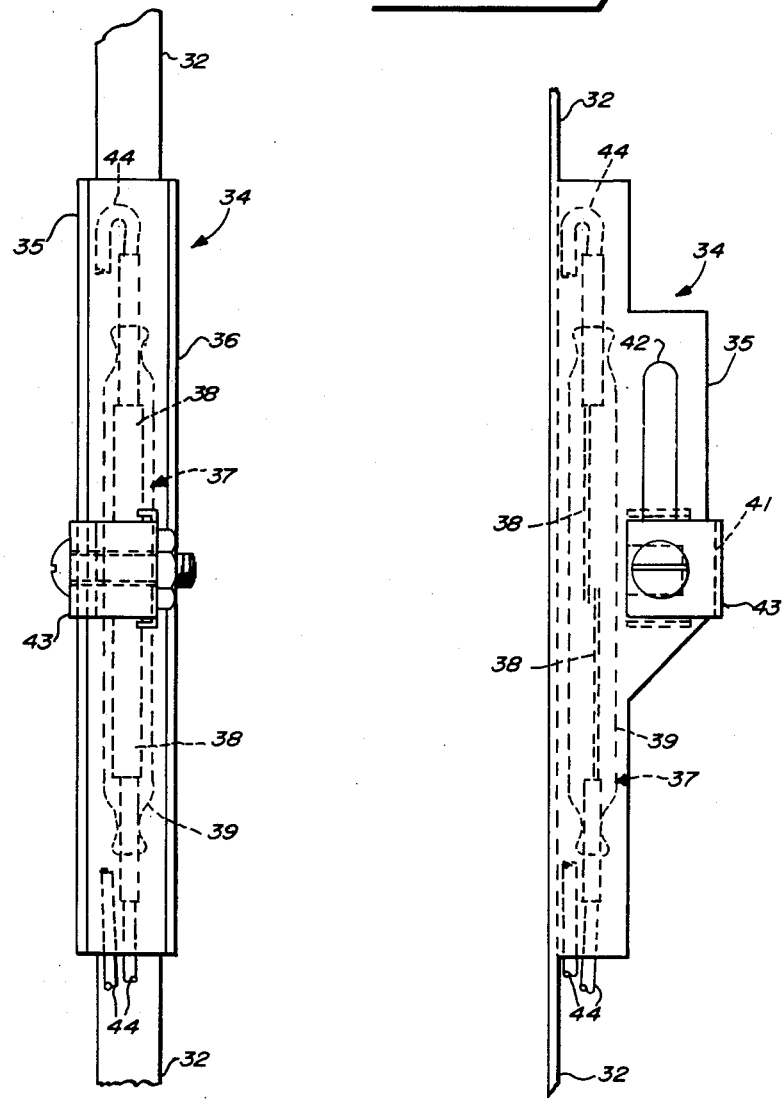

Feb. 28, 1961 R. W. BOSSEMEYER 2,973,414
CUTOFF DEVICE FOR WEIGHING SCALES
Filed July 6, 1956 4 Sheets-Sheet 4
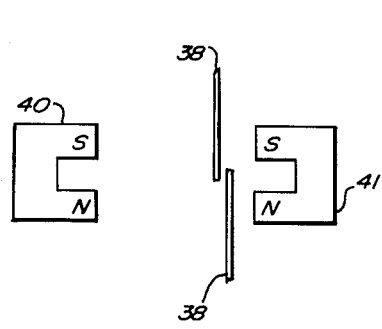
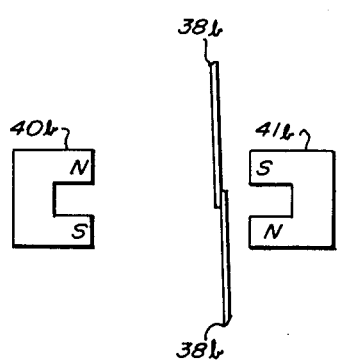
*Fig. V*
*Fig. VI*
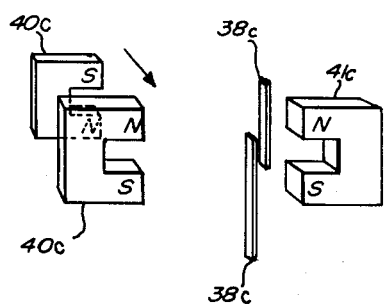
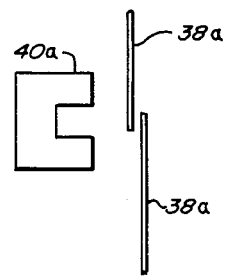
*Fig. VII*
*Fig. VIII*
INVENTOR.
ROBERT W. BOSSEMEYER
BY
ATTORNEYS

United States Patent Office 2,973,414
Patented Feb. 28, 1961

2,973,414

CUTOFF DEVICE FOR WEIGHING SCALES

Robert W. Bossemeyer, Toledo, Ohio, assignor, by mesne assignments, to Toledo Scale Corporation, Toledo, Ohio, a corporation of Ohio Filed July 6, 1956, Ser. No. 596,267

10 Claims. (Cl. 200—56)

This invention relates generally to weighing scales and in particular to improved cutoffs for controlling the flow of materials or liquids to or from the weighing scales.

Heretofore, the flow of materials or liquids to or from a weighing scale often has been electrically controlled by the use of photo-electric or mercury magnetic type cutoffs in connection with one or more relays for operating gates, valves, conveyors, belts, lights, or other devices. Such cutoffs usually are expensive and/or cumbersome and in the case of the mercury magnetic type cutoffs cause magnetic loading effects on the weight responsive scale indicators which may cause weight indication errors. Furthermore, the mercury magnetic type cutoffs are unsatisfactory from the standpoint that they may not be tipped at various angles around a weighing scale dial housing because they must be maintained more or less upright to keep the mercury in position.

Some of such cutoffs have been mounted by means which permit foreign material to enter the dial housing of the weighing scale when the scale is operated in dusty atmospheres. All of such mounting means for the cutoffs have been unsatisfactory from the standpoint that they are not easily adapted to installation on conventional weighing scales in the field to convert such scales into electrically controlled cutoff scales.

The principal object of this invention is to provide improved means for controlling the flow of materials or liquids to or from a weighing scale.

Another object of the invention is to provide improved means for mounting cutoff means for controlling the flow of materials or liquids to or from a weighing scale.

Additional objects and advantages will be apparent from the following description in which reference is had to the accompanying drawings.

A weighing scale embodying the invention includes a dial housing, a chart within the dial housing, a weight responsive indicator movable with respect to the chart, an actuating magnet carried by the indicator, and a manually operable pointer movable with respect to the chart. A first transparent cover plate is mounted on the dial housing between the indicator and the pointer and a second transparent cover plate is mounted on the dial housing in a spaced apart location from the first cover plate, with the pointer located in the space between the cover plates. The second cover plate functions as a support for mounting means for the pointer which means extend through the second cover plate into the space between the cover plates. Flow of materials or liquids to or from the weighing scale is controlled automatically by a switch that is carried by the pointer and that includes a pair of reed contacts which are sealed in a receptacle and which are actuated by the magnetic field of the magnet when the magnet is moved near to the switch by the weight responsive indicator.

Such a switch is of low cost, is not cumbersome, imparts less magnetic loading effect to the weight responsive scale indicator than ordinary mercury magnetic type cutoffs and may be tipped into any position around a dial housing. The arrangement and construction of the pair of transparent cover plates is such that the dial housing is moisture and dust proof and permits easy conversion of conventional scales in the field into electrically controlled cutoff scales.

The invention may be more readily understood from the following detailed description of specific embodiments in which reference is made to the accompanying drawings.

In the drawings:

Figure I is a fragmentary elevational view of the dial housing of a weighing scale embodying the invention.

Figure II is a vertical sectional view taken along the line II—II of Figure I.

Figure III is an enlarged elevational view of one of the normally open switches and its holder that are illustrated in Figure I.

Figure IV is an end elevational view of the switch and its holder that are illustrated in Figure III.

Figure V is a diagrammatic view illustrating the reed contacts of one of the normally open switches shown in Figure I with a biasing or helping magnet to condition the switch for closing and an actuating magnet therefor.

Figure VI is a diagrammatic view similar to Figure V showing the reed contacts of a normally closed switch with the poles of the magnets so oriented that their magnetic fields subtract.

Figure VII is a diagrammatic view illustrating the reed contacts of a normally open switch which is operated by an actuating magnet without the aid of a biasing magnet.

Figure VIII is a diagrammatic view similar to Figure V showing the reed contacts of a normally open switch with one biasing magnet and a pair of actuating magnets therefor.

These specific figures are intended merely to illustrate the invention but not necessarily to limit its scope.

A weighing scale embodying the invention may be an industrial scale of the type shown in U.S. Patent No. 2,724,585. Such a scale includes a lower frame or cabinet surmounted by a dial housing 1 and a weight responsive indicator 2 which cooperates with a series of indicia marked on the exposed face of a chart 3 to indicate the weights of loads. In scales of this type, the dial housing 1 is provided customarily with a transparent cover plate 4 which may be of glass, synthetic plastic or the like through which the chart 3 and the indicator 2 are visible.

The cover plate 4 is mounted in a rubber ring 5 and is fixed to the dial housing 1 by first inserting an end of a locating pin 6, carried by the dial housing, through an opening in the rubber ring 5 and then attaching a dial frame 7, a rubber spacer 8 and a spacer ring 9 in the order named to the dial housing 1 by means of screws 10 (Figure I) which force the rubber ring 5 against the dial housing to seal the mechanism within the dial housing against foreign materials, such as moisture and dust. The pin 6 functions as a locating means for the rubber ring 5, the dial frame 7, the rubber spacer 8 and the spacer ring 9. Ordinarily, in conventional scales, just the dial frame 7 is employed to hold the ring 5 and its cover plate 4 in place. However, the rubber spacer 8 and the spacer ring 9 are used in a weighing scale embodying the invention as a means for attaching a second transparent cover plate 11 to the dial housing 1 in a spaced apart location from the first cover plate 4.

The second transparent cover plate 11 is mounted in a rubber ring 12, which is similar to the ring 5, and is fixed to the spacer ring 9 by means of a frame 13 which is held against and fixed to the rubber ring 12 by means of a plurality of screws 14 (Figure I) that are threaded into the spacer ring 9. The space between the cover plates 4 and 11 is both moisture and dust proof because of the sealed construction of the mounting means for the plates.

The second cover plate 11 has an opening 15 within which is mounted a back plate 16 and a front plate 17 which plates are urged together by means of screws 18 and squeeze resilient gaskets 19 against the transparent cover plate 11. The back plate 16 functions as a support for a stop member 20 which depends therefrom and also supports a sleeve 21 which is welded to the plate 16. A sleeve-like hub 22 is rotatably mounted within the sleeve 21 and a small hub 23 is rotatably mounted within the sleeve-like hub 22. Knobs 24 and 25 are provided as means for manually turning the hubs 22 and 23 respectively, the knob 24 being attached by a screw to the hub 22 and the knob 25 being turned onto a threaded end of the hub 23. A pair of spring washers 26 prevents play from developing in the system. The knobs 24 and 25 may be shifted angularly with respect to each other by holding one of them stationary by means of finger pressure and turning the other. A dust cap 27 is chained to a rivet 28 fixed to the bottom of the front plate 17 and may be removably secured to the front plate 17 by sliding a pair of openings 29 in a flanged portion of the cap under a pair of rivet heads 30 carried by and in spaced apart relationship with the front plate 17. The dust cap 27 is spaced apart from the front plate 17 by means of a resilient gasket 31 which is cemented onto the front plate.

Each of the hubs 22 and 23 is provided with a manually operable pointer 32 that is located within the space between the cover plates 4 and 11 and that is movable with respect to the chart 3 by turning the proper one of the knobs 24 and 25, the pointers 32 being so bent at their center portions 33 that their upper portions travel in the same plane. The upper portion of one of the pointers 32, shown in enlargd detail in Figures III and IV, carries a switch holder 34 having a high sidewall 35 and a low sidewall 36 within which walls is cemented a normally open switch 37 for controlling the flow of materials or liquids to or from the weighing scale.

The switch 37 is of the magnetically actuated, dry-reed, glass-enclosed type and comprises two reeds 38 of magnetically soft iron-nickel alloy hermetically sealed in a glass enclosure or receptacle 39. The enclosure 39 is filled with a mixture of 97% dry nitrogen and 3% dry helium at approximately standard atmospheric pressure. The glass and reed materials are chosen for similarity of temperature coefficient among other properties required. In operation, the switch 37 may be actuated by any magnetic field varying in such manner as to exceed switch "pull-in" value and decrease below switch "drop-out" value. Such a field may be derived from either mechanical motion of a permanent magnet or from a controlled electro-magnet.

In the embodiment illustrated in Figures I and II, a permanent actuating magnet 40 is carried by the weight responsive indicator 2 for actuating the switch 37 when the magnet is moved near to the switch by the indicator. As the switch 37 is subjected to a magnetic field increasing from zero, the reeds 38 deflect to maintain equilibrium between the magnetic force tending to close the contacts and the spring forces tending to open them. When the point is reached at which magnetic force exceeds spring force, rapid closure of the switch results. The switch 37 is inherently a snap action device because the rate of increase in magnetic flux between the reed contacts with decreasing gap is very large compared to the change in spring forces tending to open the reeds 38.

A helping or biasing magnet 41 is adjustably held in a slot 42 in the high sidewall 35 of the holder 34 by means of a clip 43 in juxtaposition with the switch 37. The loading effect of the actuating magnet on the indicator is reduced by using the biasing magnet 41 to condition the switch 37 for closing. As illustrated in Figure V, the north pole of the biasing magnet 41 corresponds to the north pole of the actuating magnet 40, i. e., the poles of the magnets are so oriented that their magnetic fields add. By shifting the biasing magnet 41 longitudinally or transversely in the slot 42 in the holder 34, the reeds 38 can be made easier or harder to close.

One of the features of the invention is in the use of the biasing magnet 41 to condition the switch 37 for closing and thus aid the actuating magnet 40 to close the reeds 38. This permits the actuating magnet 40 to travel in a path which is spaced an appreciable distance from the path of the switch 37. This allows plenty of room for the transparent cover plate 4 (Figure II) and does not require that the indicator 2 be so precisely made and assembled that its manufacture might be impractical. That is, without the aid of the biasing magnet 41, as illustrated in a modification shown in Figure VII, an actuating magnet 40a must be positioned very close to the normally open reeds 38a before the reeds will close. Such position is so close that there is scarcely room to locate a transparent cover plate between the switch and an indicator carrying the actuating magnet and the indicator necessarily needs to be very precisely built and assembled so that at no point in its travel will it contact the cover plate. In contrast, in the preferred embodiment, which is illustrated in Figures I, II and V, the actuating magnet 40 may be positioned an appreciable distance from the normally open reeds 38. As shown in Figure II, there is plenty of room for the transparent cover plate 4 and there is room for the indicator 2 to wobble slightly in its path without touching the cover plate 4. Furthermore, the use of the biasing magnet imparts less magnetic loading effect on the weight responsive scale indicator to cut down possibility of scale error.

Another feature of the invention is in the construction of the mounting means for the pointers 32. When the dust cap 27 is in place no foreign material, such as moisture or dust, can enter into the space between the transparent cover plates 4 and 11 or into the dial housing 1. The pointers 32 are easily and conveniently positionable. Furthermore, conventional weighing scales in the field, by adding to the head parts only, may be easily converted into electrically controlled cutoff scales by the addition of the spacer ring 9 to the dial housing, the installation of the transparent cover plate 11 along with the pointers 32 and switches 37 as a unit, and the addition of the actuating magnet 40 to the indicator 2. No fixtures or gages are needed for the conversion.

In operation, that one of the pointers 32, as viewed in Figure I, remote from the weight responsive indicator 2 is manually set for the desired final cutoff weight. The other one of the pointers 32 is manually set at a suitable dribble point ahead of the final cutoff point. The double cutoff is used in connection with one or more relays for operating gates, valves, conveyors, belts, lights or any two-speed feeding device. As load is applied to the scale, the indicator 2 moves clockwise from zero toward the desired weight with initial feeding permitted at a fast rate. When the actuating magnet 40 approaches near to the first one of the normally open switches 37, the switch is closed and the feeding device changes to slow feed for the final feeding until the second one of the normally open switches 37 is operated by the actuating magnet for the final cutoff. It is desirable to use the double cutoff when a relatively short period of time is available to complete the weighing so as to reduce the amount of material in suspension between the source of supply and the level of material on the scale, thereby giving greater accuracy. In some installations, it may be desirable to connect the pointers 32 in a semi-adjustable manner and then move the whole assembly when it is desirable to change the cutoff point. In other installations, it may be desirable to locate the actuating magnet on a projection extending to one side of the pointer 32 so that the switch 37 will be operated at a different weight than that which is indicated by the pointer on the chart. As illustrated in Figures I and II, the pointers 32 may be positioned at any point around the chart 3, i.e., it is possible to obtain cutoff operation anywhere from zero to full dial, but they cannot be moved past the stop member 20 so that lead wires 44 soldered to the cutoff switch terminals will not get twisted up. It is possible to accomplish double cutoff with a single switch 37, since the range over which the switch will remain operated (dribble feed) is quite wide and adjustable, i.e., as the biasing magnet 41 is moved away from the switch contact gap the range over which the switch remains operated decreases. An ordinary stepping relay may be used in this connection. However, preferably two switches are used for all double cutoff operations.

In addition to being useful for double adjustable cutoff applications, the switch 37 may be used in single adjustable cutoff applications for controlling a single-speed feeding device.

The switches 37 also may be used as zero cutoff controls. A weighing scale of the type shown in the hereinbefore mentioned U.S. Patent No. 2,724,585 utilizing zero cutoff controls is adjusted so that its load counterbalancing pendulums are in a raised or full capacity position when the indicator is at zero. Desired cutoff weight settings are made by positioning poises on the beams of the scale. The desired weight will then be indicated on the chart 3. As weight is applied, the indicator revolves counterclockwise back toward zero. When the indicator reaches zero, the switch 37 is operated and the cutoff occurs.

The dial housing 1 may have a capacity of from one to three double adjustable cutoffs (six switches 37) plus a single zero switch. Thus, if double dial indication is used, a maximum of six double adjustable cutoffs (twelve switches 37) may be used per scale. Such a multiple cutoff unit finds use in many batching systems where the prior art mercury magnetic type cutoffs cannot be used effectively because they may not be tipped beyond a certain point. Two adjustable mercury magnetic type cutoffs for handling two ingredients is normally the maximum permitted on one scale.

The improved cutoffs, thus, may perform three different functions. The zero or "no load" type switch actuates when the load responsive indicator returns to zero indicating that all of the live load is off of the scale. The adjustable single cutoff actuates as the indicator passes a preset position on the dial chart indicating that the live load has reached a predetermined quantity. Since the indicator lags behind the actual live load as it is applied, the cutoff is set a distance ahead of the desired weight when used in applications such as filling a hopper. Since the accuracy of the final weight depends upon uniformity of feed and feed rate, a double cutoff allows a much shorter weigh cycle and still retains final weight accuracy. For a large portion of the filling cycle, a much faster and less uniform feed rate can be used. As the live weight approaches the desired value, the first cutoff actuates to change the feed to a slower and more uniform feed and the second cutoff performs the final cutoff operation.

It it is desired to operate the switch 37 as a normally closed switch, a stronger biasing magnet 41b (Figure VI) is substituted for the biasing magnet 41 and the north pole of the actuating magnet 40b is located so that it corresponds to the south pole of the biasing magnet 41b, i.e., the poles of the magnets are so oriented that their magnetic fields subtract, as indicated in Figure VI.

If it is desired to greatly decrease the range over which the normally open switch 37 will remain operated or closed, magnetic shields may be provided one on each side of the switch so that it will close only when the actuating magnet is very closely adjacent or two actuating magnets may be provided and carried by the indicator 2 as illustrated in Figure VIII. In the modification shown in Figure VIII, a biasing magnet 41c is just strong enough to keep the reeds 38c together after they have been closed by the front actuating magnet 40c which travels in the direction indicated by the arrow. The back actuating magnet 40c reopens the momentarily closed reed contacts of the switch. The poles of the three magnets must be oriented as indicated in Figure VIII. After the weighing cycle is completed and the indicator returns the actuating magnets 40c in a direction opposite to that indicated by the arrow, the reeds 38c may be reopened by a third actuating magnet carried by the indicator which magnet is located in front of the actuating magnets as viewed in Figure VIII and oriented so that the magnetic fields of the added or third actuating magnet and the biasing magnet subtract.

All of the embodiments shown in Figures V–VIII cause less magnetic loading effect on the indicator than the mercury magnetic switches heretofore used, all are less expensive and less cumbersome than the mercury magnetic and photo-electric type switches heretofore used, and may be tipped in any position in contrast to mercury switches which must be maintained more or less upright. Furthermore, all of the embodiments are especially useful in batching systems which require multiple cutoff units.

The embodiments of the invention that have been disclosed may be modified to meet various requirements.

Having described the invention, I claim:

1. A weighing scale comprising, in combination, a dial housing, a chart within the dial housing, a weight responsive indicator movable with respect to the chart, an actuating magnet carried by the indicator, a manually operable pointer movable with respect to the chart, a first transparent cover plate that is mounted on the dial housing and that is located between the indicator and the pointer, a second transparent cover plate that is mounted on the dial housing and that is spaced apart from the first cover plate, the pointer being located in the space between the cover plates, mounting means for the pointer that is carried by the second cover plate and that extends through the second cover plate into the space between the cover plates, and a switch that is carried by the pointer and that includes a pair of reeds which are sealed in a receptacle and which are actuated by the magnetic field of the magnet when the magnet is moved near to the switch by the weight responsive indicator.

2. Apparatus according to claim 1 wherein the switch is normally open.

3. Apparatus according to claim 1 wherein a biasing magnet is carried by the pointer in juxtaposition with the switch to magnetically bias the reeds to a normally closed position, the poles of the magnets being so oriented that their magnetic fields subtract.

4. Apparatus according to claim 1 wherein the switch is normally open and a biasing magnet is carried by the pointer in juxtaposition with the switch, the poles of the magnets being so oriented that their magnetic fields add.

5. Apparatus according to claim 1 wherein the switch is normally open, a biasing magnet is carried by the pointer in juxtaposition with the switch and a second actuating magnet is carried by the indicator, one of the actuating magnets functioning to close the switch, the other of the actuating magnets functioning to reopen the switch, and the biasing magnet functioning to keep the switch closed momentarily between the interval it is closed and reopened by said actuating magnets.

6. In a device of the class described, in combination, a dial housing, a chart within the dial housing, a weight responsive indicator movable with respect to the chart, an actuating magnet carried by the indicator, a manually operable pointer movable with respect to the chart, mounting means for the pointer, a normally open switch that is carried by the pointer and that includes a pair of reeds which are sealed in a receptacle and which are actuated by the magnetic field of the actuating magnet when the actuating magnet is moved near to the switch by the weight responsive indicator, and a biasing magnet carried by the pointer in juxtaposition with the switch to condition the switch for closing, the poles of the magnets being so oriented that their magnetic fields add.

7. A device according to claim 6 wherein a second actuating magnet is carried by the indicator, one of the actuating magnets functioning to close the switch, the other of the actuating magnets functioning to reopen the switch, and the biasing magnet functioning to keep the switch closed momentarily between the interval it is closed and reopened by said actuating magnets.

8. A device according to claim 6 wherein the biasing magnet is carried by the pointer in juxtaposition with the switch to magnetically bias the reeds to a normally closed position, the poles of the magnets being so oriented that their magnetic fields subtract.

9. Means for use in combination with an indicating hand and an index dial of a weighing scale for closing an electric circuit when said hand reaches a predetermined position relative to said dial, comprising: a housing positioned forwardly of said dial; a front plate closing the front of said housing; a bearing device mounted on said front plate in axial alignment with the axis of said hand; a switch arm rotatably supported by said bearing device within said housing; a magnetically-operated switch carried by said arm adjacent said dial; and a permanent magnet attached to said hand and positioned to actuate said switch when said hand approaches the latter.

10. Means for use in combination with an indicating hand and an index dial of a weighing scale for closing an electric circuit when said hand reaches a predetermined position relative to said dial, comprising: a housing supported forwardly of said dial; a front plate closing the front of said housing; a bearing tube mounted in said front plate and extending into said housing in axial alignment with the axis of said hand; a plurality of hubs rotatably mounted on said bearing tube in side-by-side arrangement; a switch arm mounted on each hub and extending radially outward and rearward to a position adjacent said dial; a magnetically-operated switch carried at the rear extremity of each switch arm adjacent said dial; and a permanent magnet mounted on said indicating hand so as to swing into proximity with said switches for actuating the latter.

References Cited in the file of this patent
UNITED STATES PATENTS

| | | |
|---|---|---|
| 2,249,369 | Williams | July 15, 1941 |
| 2,329,370 | Hicks et al. | Sept. 14, 1943 |
| 2,336,326 | Weckerly | Dec. 7, 1943 |
| 2,341,251 | Walther | Feb. 8, 1944 |
| 2,378,986 | Dickten | June 26, 1945 |
| 2,406,021 | Little | Aug. 20, 1946 |
| 2,550,605 | Schenck | Apr. 24, 1951 |
| 2,880,286 | Ferris | Mar. 31, 1959 |